(12) United States Patent
Zhang

(10) Patent No.: US 11,138,704 B2
(45) Date of Patent: Oct. 5, 2021

(54) INTELLIGENT POLICE CAR LOUDSPEAKER

(71) Applicant: YUYAO FEITE PLASTIC CO., LTD., Yuyao (CN)

(72) Inventor: Shanqin Zhang, Yuyao (CN)

(73) Assignee: YUYAO FEITE PLASTIC CO., LTD., Yuyao (CN)

( * ) Notice: Subject to any disclaimer, the term of this patent is extended or adjusted under 35 U.S.C. 154(b) by 505 days.

(21) Appl. No.: 16/303,357

(22) PCT Filed: Jun. 30, 2017

(86) PCT No.: PCT/CN2017/091159
§ 371 (c)(1),
(2) Date: Nov. 20, 2018

(87) PCT Pub. No.: WO2018/223466
PCT Pub. Date: Dec. 13, 2018

(65) Prior Publication Data
US 2021/0224965 A1    Jul. 22, 2021

(30) Foreign Application Priority Data
Jun. 6, 2017 (CN) .......................... 201710418088.2

(51) Int. Cl.
*G06T 5/20* (2006.01)
*G06T 1/00* (2006.01)
(Continued)

(52) U.S. Cl.
CPC .............. *G06T 5/20* (2013.01); *G06T 1/0007* (2013.01); *G06T 7/44* (2017.01); *H04R 9/046* (2013.01);
(Continued)

(58) Field of Classification Search
CPC .......... G06T 5/20; G06T 1/0007; G06T 7/44; G06T 2207/20024; H04R 9/046; H04R 2400/11
See application file for complete search history.

(56) References Cited

U.S. PATENT DOCUMENTS

2007/0159354 A1* 7/2007 Rosenberg ........... G08G 1/0965
340/902
2016/0046235 A1* 2/2016 Lee ........................ B60Q 5/006
381/86

FOREIGN PATENT DOCUMENTS

CN           2483924 Y         3/2002
CN        201400253 Y    *    2/2010
(Continued)

OTHER PUBLICATIONS

International Search Report issued in International Application No. PCT/CN2017/091159, dated Feb. 24, 2018.
(Continued)

*Primary Examiner* — Sumati Lefkowitz
*Assistant Examiner* — Dalen O Goodson
(74) *Attorney, Agent, or Firm* — Charles C. Achkar; Ostrolenk Faber LLP.

(57) ABSTRACT

An intelligent police car loudspeaker includes a loudspeaker mechanism composed of a dust cover, a paper cone, a yoke ring, a centering piece, a magnet, a voice coil, and a soft iron core. The voice coil is disposed around the soft iron core. The magnet is disposed around the voice coil. The paper cone is disposed above the magnet. The centering piece is disposed above the magnet and located inside the paper cone. The yoke ring is disposed above the centering piece and located inside the paper cone. The dust cover is configured to cover an opening of the paper cone. With the present invention, the level of intelligence of the loudspeaker can be improved.

6 Claims, 1 Drawing Sheet

(51) Int. Cl.
*H04R 9/04* (2006.01)
*G06T 7/44* (2017.01)

(52) U.S. Cl.
CPC ............. *G06T 2207/20024* (2013.01); *H04R 2400/11* (2013.01)

(56) References Cited

FOREIGN PATENT DOCUMENTS

| | | | | | |
|---|---|---|---|---|---|
| CN | 103823626 | A | | 5/2014 | |
| CN | 104796826 | A | | 7/2015 | |
| CN | 105356397 | A | | 2/2016 | |
| CN | 105517396 | A | | 4/2016 | |
| CN | 105943273 | A | | 9/2016 | |
| CN | 105952168 | A | | 9/2016 | |
| CN | 107415827 | B | * | 9/2019 | ............. H04N 9/735 |
| CN | 110386061 | A | * | 10/2019 | |
| EP | 0610001 | B1 | | 9/2001 | |
| WO | WO-2009097449 | A1 | * | 8/2009 | ........... H04N 19/172 |
| WO | WO-2018223459 | A1 | * | 12/2018 | ......... G06K 9/00288 |

OTHER PUBLICATIONS

Written Opinion issued in International Application No. PCT/CN2017/091159, dated Feb. 24, 2018.

* cited by examiner

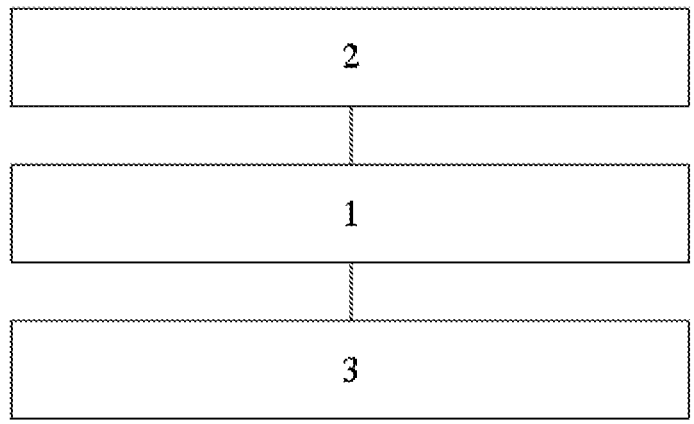

INTELLIGENT POLICE CAR LOUDSPEAKER

CROSS REFERENCE TO RELATED APPLICATIONS

The present application is a § 371 National Phase application based on PCT/CN2017/091159 filed Jun. 30, 2017, which claims the benefit of China application No. 201710418088.2 filed Jun. 6, 2017, the subject matter of each of which is incorporated by reference in their entirety.

FIELD OF THE INVENTION

The present invention relates to an electronic loudspeaker, and more particularly to an intelligent police car loudspeaker.

BACKGROUND OF THE INVENTION

There are many types of speakers, which can be classified into electric type (i.e. moving coil type), electrostatic type (i.e. capacitive type), electromagnetic type (i.e. reed type), and piezoelectric type (i.e. crystal type) according to the principle of transducing. The latter two are mostly used in rural wired broadcasting networks. They can be classified into low frequency speakers, intermediate frequency speakers, and high frequency speakers according to the frequency range, which are often used as combined speakers.

According to the principle and structure of transducing, speakers are classified into moving coil type (electric type), capacitive type (electrostatic type), piezoelectric type (crystal or ceramic), electromagnetic type (reed type), electric ion type, pneumatic type, and so on. The electric speaker has the advantages of good electroacoustic performance, firm structure and low cost, so it is widely used.

According to the sound radiation material, speakers are classified into paper cone type, cylindrical type and diaphragm type. According to the shape of the paper cone, they are classified into circle, oval, double paper cone, and rubber folding ring. According to the working frequency, they are classified into tweeter, midrange, and woofer. Some are classified into recorder-specific, TV-specific, ordinary and high-fidelity speakers. According to the voice coil impedance, they are classified into low impedance and high impedance. According to the effect, they are classified into direct and ambient sounds.

Speakers are classified into built-in speakers and external speakers. External speakers are commonly referred to as loudspeakers. A built-in speaker means that a MP4 player has a built-in speaker, so that the user can listen to the sound of the MP4 player through a headphone jack or through the built-in speaker. There is no need for the MP4 player with the built-in speaker to connect an external speaker, thereby avoiding the inconvenience of wearing a headset for a long time.

The loudspeakers used in police cars are custom-made and usually deter the criminals in a midrange manner, but their functions are limited to this. The sounding frequency of the existing police car loudspeaker is fixed, without considering the number of vehicles in front. When the number of vehicles in front is too large, the warning effect of the fixed sounding frequency is quite limited.

SUMMARY OF THE INVENTION

In order to solve the above problems, the present invention provides an intelligent police car loudspeaker, which performs image data acquisition in front of the police car to output an adaptive image, and performs vehicle body recognition on the adaptive image to obtain the number of vehicles in front to output as a real-time number of vehicles in front, and determine a sounding frequency of the loudspeaker mechanism based on the real-time number of vehicles in front. The more the real-time number of vehicles in front, the higher the sounding frequency of the loudspeaker mechanism According to one aspect of the present invention, an intelligent police car loudspeaker is provided. The intelligent police car loudspeaker comprises a loudspeaker mechanism composed of a dust cover, a paper cone, a yoke ring, a centering piece, a magnet, a voice coil, and a soft iron core. The voice coil is disposed around the soft iron core. The magnet is disposed around the voice coil. The paper cone is disposed above the magnet. The centering piece is disposed above the magnet and located inside the paper cone. The yoke ring is disposed above the centering piece and located inside the paper cone. The dust cover is configured to cover an opening of the paper cone.

Preferably, the intelligent police car loudspeaker further comprises a light intensity detecting device disposed on the roof of a police car for detecting the intensity of illumination light outside the police car to output real-time light intensity.

Preferably, the intelligent police car loudspeaker further comprises a light intensity change rate detecting device connected to the light intensity detecting device for detecting a change rate of the real-time light intensity. When the change rate of the real-time light intensity is greater than or equal to a preset change rate threshold, a signal that the change rate is too high is transmitted, otherwise, a signal that the change rate is normal is transmitted.

Preferably, the intelligent police car loudspeaker further comprises:

an adaptive sensing device disposed on the dust cover and connected to the light intensity change rate detecting device for performing image data acquisition in front of the police car to output an adaptive image;

the adaptive sensing device including a pixel data reading device and pixel data acquiring devices, each pixel data acquiring device including a plurality of CCD sensing units connected in parallel, wherein when receiving the signal that the change rate is normal, each pixel data acquiring device uses the data sensed by one of the plurality of CCD sensing units connected in parallel and outputs the data; when receiving the signal that the change rate is too high, each pixel data acquiring device combines the data sensed by the plurality of CCD sensing units connected in parallel and outputs the data; the pixel data reading device is connected with each of the pixel data acquiring devices for reading the data output by each of the pixel data acquiring devices as a pixel value of each pixel, the pixel values of the respective pixels constitute the adaptive image;

a first filtering device configured to perform the following filtering process: performing a 5-level decomposition and reconstruction on the received image by using a HARR wavelet base of length 6 to obtain a filtered image output by the first filtering device;

a second filtering device configured to perform the following filtering process: for each pixel of the received image, using various filtering windows to acquire corresponding pixel blocks centered on the pixel, and determining a variance of a gray value in each of the pixel blocks, and selecting the corresponding filtering window with the smallest variance of the gray value as a target filtering window for performing midrange filtering on the pixel value of the pixel to obtain a filtered pixel value thereof, and acquiring a filtered image output by the second filtering device based on the filtered pixel values of all the pixels of the received image;

an adaptive recursive filtering device configured to perform the following filtering process: performing adaptive recursive filtering processing on the received image to obtain a filtered image output by the adaptive recursive filtering device;

a first image initial detecting device connected with the adaptive sensing device for receiving the adaptive image, based on the pixel values of respective pixels of the adaptive image, determining a mean square error of the pixel values of the adaptive image to output as a target mean square error;

a second image initial detecting device configured to receive the adaptive image for performing noise analysis on the adaptive image to obtain a primary noise signal with the largest noise amplitude and a secondary noise signal with the second largest noise amplitude, and determining a signal-to-noise ratio of the adaptive image to output as a target signal-to-noise ratio based on the primary noise signal, the secondary noise signal and the adaptive image;

an IMX6 processor connected with the adaptive recursive filtering device, the first filtering device, the second filtering device, the first image initial detecting device and the second image initial detecting device for receiving the target mean square error and the target signal-to-noise ratio; wherein when the target signal-to-noise ratio is less than or equal to a preset signal-to-noise ratio threshold and the target mean square error is greater than or equal to a preset mean square error threshold, the first filtering device and the second filtering device are sequentially used to perform filtering processing on the adaptive image to obtain a processed image; when the target signal-to-noise ratio is less than or equal to the preset signal-to-noise ratio threshold and the target mean square error is greater than the preset mean square error threshold, the second filtering device is used to perform filtering processing on the adaptive image to obtain the processed image; when the target signal-to-noise ratio is greater than the preset signal-to-noise ratio threshold and the target mean square error is greater than or equal to the preset mean square error threshold, the first filtering device is used to perform filtering processing on the adaptive image to obtain the processed image; when the target signal-to-noise ratio is greater than the preset signal-to-noise ratio threshold and the target mean square error is less than the preset mean square error threshold, the adaptive recursive filtering device is used to perform filtering processing on the adaptive image to obtain the processed image;

a vehicle detecting device connected with the IMX6 processor for receiving the processed image and performing vehicle body recognition on the processed image to obtain the number of vehicles in the processed image to output as a real-time number of vehicles in front.

wherein the IMX6 processor is further connected with the loudspeaker mechanism and the vehicle detecting device for receiving the real-time number of vehicles in front and determining a sounding frequency of the loudspeaker mechanism based on the real-time number of vehicles in front, the more the real-time number of vehicles in front, the higher the sounding frequency of the loudspeaker mechanism;

wherein for the IMX6 processor, determining the sounding frequency of the loudspeaker mechanism based on the real-time number of vehicles in front further includes: when the real-time number of vehicles in front is less than or equal to a preset number, the sounding frequency of the loudspeaker mechanism is maintained at a fixed value.

Preferably, the intelligent police car loudspeaker further comprises a cylindrical bracket disposed on the roof of the police car for fixing the loudspeaker mechanism and the light intensity detecting device.

Preferably, in the intelligent police car loudspeaker, the first filtering device, the second filtering device, the adaptive recursive filtering device, the first image initial detecting device, the second image initial detecting device and the vehicle detecting device are respectively implemented by using different CPLD chips.

Preferably, in the intelligent police car loudspeaker, the first filtering device, the second filtering device, the adaptive recursive filtering device, the first image initial detecting device, the second image initial detecting device and the vehicle detecting device are integrated on an integrated circuit board.

Preferably, in the intelligent police car loudspeaker, the first filtering device, the second filtering device, the adaptive recursive filtering device, the first image initial detecting device, the second image initial detecting device and the vehicle detecting device are disposed in a front dashboard of the police car.

Preferably, in the intelligent police car loudspeaker, the function of the light intensity change rate detecting device is replaced by the IMX6 processor.

BRIEF DESCRIPTION OF THE DRAWINGS

The embodiments of the present invention will be described below with reference to the accompanying drawings, in which:

FIG. 1 is a structural block diagram of an intelligent police car loudspeaker according to an embodiment of the present invention.

List of reference numbers: 1 loudspeaker mechanism; 2 output power controller; 3 manual switch

DETAILED DESCRIPTION OF THE PREFERRED EMBODIMENTS

An embodiment of the intelligent police car loudspeaker of the present invention will be described in detail below with reference to the accompanying drawings.

There are various loudspeakers made of different materials on the market. Paper cones are natural, cheap and lighter in material and have better rigidity and high sensitivity, but have the disadvantages of poor moisture resistance, and consistency in manufacturing is difficult to control. However, the top HiFi system is made up of paper cones because the sound output is very average and the reduction is good. Bulletproof cloth with wide frequency response and low distortion is the first choice for those who love strong bass, but it has the disadvantages of high cost, complicated production process and low sensitivity. It is not suitable for light music. Wool woven cones are soft, which is suitable for soft music and light music. But, the bass effect is not good, lacking of strength and shock. PP (polypropylene) cones are widely used in high-end loudspeakers, having good consistency and low distortion. All aspects of performance are remarkable. In addition, fiber diaphragms and composite diaphragms are rarely used in common loudspeakers due to their high price.

The existing police car loudspeaker has a fixed sounding frequency and cannot be adaptively adjusted according to the number of vehicles in front. As a result, when there is no vehicle in front or when there is traffic congestion in front, a fixed sounding frequency is used to notify the vehicles in front, leading to a poor warning effect. In order to overcome the above deficiencies, the present invention provides an intelligent police car loudspeaker to solve the above technical problems.

FIG. 1 is a structural block diagram of an intelligent police car loudspeaker according to an embodiment of the present invention. The system comprises a loudspeaker mechanism composed of a dust cover, a paper cone, a yoke ring, a centering piece, a magnet, a voice coil, and a soft iron core. The voice coil is disposed around the soft iron core. The system further includes an output power controller and a manual switch. The loudspeaker mechanism is connected to the output power controller and the manual switch, respectively.

The magnet is disposed around the voice coil. The paper cone is disposed above the magnet. The centering piece is disposed above the magnet and located inside the paper cone. The yoke ring is disposed above the centering piece and located inside the paper cone. The dust cover is configured to cover an opening of the paper cone.

Next, the specific structure of the intelligent police car loudspeaker of the present invention will be further described.

The intelligent police car loudspeaker further comprises a light intensity detecting device disposed on the roof of a police car for detecting the intensity of the illumination light outside the police car to output real-time light intensity.

The intelligent police car loudspeaker further comprises a light intensity change rate detecting device connected to the light intensity detecting device for detecting the change rate of the real-time light intensity. When the change rate of the real-time light intensity is greater than or equal to a preset change rate threshold, a signal that the change rate is too high is transmitted, otherwise, a signal that the change rate is normal is transmitted.

The intelligent police car loudspeaker further includes an adaptive sensing device disposed on the dust cover and connected to the light intensity change rate detecting device for performing image data acquisition in front of the police car to output an adaptive image.

The adaptive sensing device includes a pixel data reading device and pixel data acquiring devices. Each pixel data acquiring device includes a plurality of CCD sensing units connected in parallel. When receiving the signal that the change rate is normal, each pixel data acquiring device uses the data sensed by only one of the plurality of CCD sensing units connected in parallel and outputs the data. When receiving the signal that the change rate is too high, each pixel data acquiring device combines the data sensed by the plurality of CCD sensing units connected in parallel and outputs the data. The pixel data reading device is connected with each of the pixel data acquiring devices for reading the data output by each of the pixel data acquiring devices as a pixel value of each pixel. The pixel values of the respective pixels constitute the adaptive image.

A first filtering device is configured to perform the following filtering process: performing a 5-level decomposition and reconstruction on the received image by using a HARR wavelet base of length 6 to obtain a filtered image output by the first filtering device.

A second filtering device is configured to perform the following filtering process: for each pixel of the received image, using various filtering windows to acquire corresponding pixel blocks centered on the pixel, and determining the variance of the gray value in each of the pixel blocks, and selecting the corresponding filtering window with the smallest variance of the gray value as a target filtering window for performing midrange filtering on the pixel value of the pixel to obtain a filtered pixel value thereof, and acquiring a filtered image output by the second filtering device based on the filtered pixel values of all the pixels of the received image.

An adaptive recursive filtering device is configured to perform the following filtering process: performing adaptive recursive filtering processing on the received image to obtain a filtered image output by the adaptive recursive filtering device. A first image initial detecting device is connected with the adaptive sensing device for receiving the adaptive image, based on pixel values of respective pixels of the adaptive image, determining a mean square error of the pixel values of the adaptive image to output as a target mean square error;

A second image initial detecting device is configured to receive the adaptive image, and perform noise analysis on the adaptive image to obtain a primary noise signal with the largest noise amplitude and a secondary noise signal with the second largest noise amplitude, and determine a signal-to-noise ratio of the adaptive image to output as a target signal-to-noise ratio based on the primary noise signal, the secondary noise signal and the adaptive image.

An IMX6 processor is connected with the adaptive recursive filtering device, the first filtering device, the second filtering device, the first image initial detecting device and the second image initial detecting device for receiving the target mean square error and the target signal-to-noise ratio. When the target signal-to-noise ratio is less than or equal to a preset signal-to-noise ratio threshold and the target mean square error is greater than or equal to a preset mean square error threshold, the first filtering device and the second filtering device are sequentially used to perform filtering processing on the adaptive image to obtain a processed image. When the target signal-to-noise ratio is less than or equal to the preset signal-to-noise ratio threshold and the target mean square error is greater than the preset mean square error threshold, the second filtering device is used to perform filtering processing on the adaptive image to obtain the processed image. When the target signal-to-noise ratio is greater than the preset signal-to-noise ratio threshold and the target mean square error is greater than or equal to the preset mean square error threshold, the first filtering device is used to perform filtering processing on the adaptive image to obtain the processed image. When the target signal-to-noise ratio is greater than the preset signal-to-noise ratio threshold and the target mean square error is less than the preset mean square error threshold, the adaptive recursive filtering device is used to perform filtering processing on the adaptive image to obtain the processed image.

A vehicle detecting device is connected with the IMX6 processor for receiving the processed image and performing vehicle body recognition on the processed image to obtain the number of vehicles in the processed image to output as a real-time number of vehicles in front.

Wherein, the IMX6 processor is further connected with the loudspeaker mechanism and the vehicle detecting device for receiving the real-time number of vehicles in front and determining a sounding frequency of the loudspeaker mechanism based on the real-time number of vehicles in front. The more the real-time number of vehicles in front, the higher the sounding frequency of the loudspeaker mechanism. For the IMX6 processor, determining the sounding frequency of the loudspeaker mechanism based on the real-time number of vehicles in front further includes: when the real-time number of vehicles in front is less than or equal to a preset number, the sounding frequency of the loudspeaker mechanism is maintained at a fixed value.

The intelligent police car loudspeaker further comprises a cylindrical bracket disposed on the roof of the police car for fixing the loudspeaker mechanism and the light intensity detecting device.

In the intelligent police car loudspeaker, the first filtering device, the second filtering device, the adaptive recursive filtering device, the first image initial detecting device, the second image initial detecting device and the vehicle detecting device are respectively implemented by using different CPLD chips.

In the intelligent police car loudspeaker, the first filtering device, the second filtering device, the adaptive recursive filtering device, the first image initial detecting device, the second image initial detecting device and the vehicle detecting device are integrated on the same integrated circuit board.

In the intelligent police car loudspeaker, the first filtering device, the second filtering device, the adaptive recursive filtering device, the first image initial detecting device, the second image initial detecting device and the vehicle detecting device are disposed in a front dashboard of the police car.

In the intelligent police car loudspeaker, alternatively, the function of the light intensity change rate detecting device is replaced by the IMX6 processor.

In addition, image filtering, that is, suppressing the noise of the target image under the condition of retaining the details of the image as much as possible, is an indispensable operation in image preprocessing. The quality of the processing will directly affect the effectiveness and reliability of subsequent image processing and analysis.

Due to imperfections in imaging systems, transmission media and recording devices, digital images are often contaminated by various noises during their formation, transmission and recording. In addition, in some parts of image processing, when the input image is not as expected, noises are introduced into the resulting image. These noises often appear as an isolated pixel or pixel block, causing a strong visual effect on the image. In general, the noise signal is not related to the object to be studied. It appears as useless information, disturbing the observable information of the image. For digital image signals, the noise table is large or small extreme values. These extreme values act on the true gray value of the pixels of the image by adding and subtracting, causing bright and dark interference to the image, which greatly reduces the quality of the image and affects the subsequent work, such as image restoration, segmentation, feature extraction, image recognition, etc. Constructing a filter that effectively suppresses noise must consider two basic factors: it can effectively remove the noise in the target and the background; and it can well protect the shape, size and specific geometric and topological features of the image target.

One of the commonly used image filtering modes is a nonlinear filter. In general, when the signal spectrum is mixed and superimposed with the noise spectrum or when the signal contains non-superimposed noises, such as noises caused by system nonlinearity or non-Gaussian noise, etc., conventional linear filtering techniques, such as the Fourier transform, always blur the details of the image (such as edges) in a certain manner, which leads to a decrease in the positioning accuracy of the linear features and the extractability of the features. The nonlinear filter is based on a nonlinear mapping relationship to the input signal. It is often possible to map a particular noise to approximately zero while preserving the characteristics of the signal, so that it can overcome the shortcomings of the linear filter to a certain extent.

The intelligent police car loudspeaker of the present invention is to solve the technical problem of the fixed sounding frequency of the conventional police car loudspeaker, by integrating the high-precision image acquisition equipment and image processing equipment of the existing police car loudspeaker to achieve accurate acquisition of the number of vehicles in front and to establish a mechanism for determining the sounding frequency of the police car loudspeaker based on the number of vehicles in front, thereby avoiding the dullness and invariability of the sounding frequency of the police car loudspeaker.

It is to be understood that the above-described embodiments are not intended to limit the present invention, although particular embodiments of the present invention have been described in detail for purposes of illustration. For those skilled in the art, many possible variations, modifications and equivalent embodiments may be made to the technical solutions of the present, without departing from the scope of the present invention. Therefore, any simple modifications, equivalent changes, and enhancements of the above embodiments may be made without departing from the spirit and scope of the invention.

What is claimed is:

1. An intelligent police car loudspeaker, comprising a loudspeaker mechanism composed of a dust cover, a paper cone, a yoke ring, a centering piece, a magnet, a voice coil and a soft iron core, the voice coil being disposed around the soft iron core, the magnet being disposed around the voice coil, the paper cone being disposed above the magnet, the centering piece being disposed above the magnet and located inside the paper cone, the yoke ring being disposed above the centering piece and located inside the paper cone, the dust cover being configured to cover an opening of the paper cone;

further comprising a light intensity detecting device disposed on the roof of a police car for detecting the intensity of illumination light outside the police car to output real-time light intensity;

further comprising a light intensity change rate detecting device connected to the light intensity detecting device for detecting a change rate of the real-time light intensity, wherein when the change rate of the real-time light intensity is greater than or equal to a preset change rate threshold, a signal that the change rate is too high is transmitted, otherwise, a signal that the change rate is normal is transmitted;

further comprising:

an adaptive sensing device disposed on the dust cover and connected to the light intensity change rate detecting device for performing image data acquisition in front of the police car to output an adaptive image;

the adaptive sensing device including a pixel data reading device and pixel data acquiring devices, each pixel data acquiring device including a plurality of CCD sensing units connected in parallel, wherein when receiving the signal that the change rate is normal, each pixel data acquiring device uses the data sensed by one of the plurality of CCD sensing units connected in parallel and outputs the data; when receiving the signal that the change rate is too high, each pixel data acquiring device combines the data sensed by the plurality of CCD sensing units connected in parallel and outputs the data; the pixel data reading device is connected with each of the pixel data acquiring devices for reading the data output by each of the pixel data acquiring devices as a pixel value of each pixel, the pixel values of the respective pixels constitute the adaptive image;

a first filtering device configured to perform the following filtering process: performing a 5-level decomposition and reconstruction on the received image by using a HARR wavelet base of length 6 to obtain a filtered image output by the first filtering device;

a second filtering device configured to perform the following filtering process: for each pixel of the received image, using various filtering windows to acquire corresponding pixel blocks centered on the pixel, and determining a variance of a gray value in each of the pixel blocks, and selecting the corresponding filtering window with the smallest variance of the gray value as a target filtering window for performing midrange filtering on the pixel value of the pixel to obtain a filtered pixel value thereof, and acquiring a filtered image output by the second filtering device based on the filtered pixel values of all the pixels of the received image;

an adaptive recursive filtering device configured to perform the following filtering process: performing adaptive recursive filtering processing on the received image to obtain a filtered image output by the adaptive recursive filtering device;

a first image initial detecting device connected with the adaptive sensing device for receiving the adaptive image, based on the pixel values of respective pixels of the adaptive image, determining a mean square error of the pixel values of the adaptive image to output as a target mean square error;

a second image initial detecting device configured to receive the adaptive image for performing noise analysis on the adaptive image to obtain a primary noise signal with the largest noise amplitude and a secondary noise signal with the second largest noise amplitude, and determining a signal-to-noise ratio of the adaptive image to output as a target signal-to-noise ratio based on the primary noise signal, the secondary noise signal and the adaptive image; an IMX6 processor connected with the adaptive recursive filtering device, the first filtering device, the second filtering device, the first image initial detecting device and the second image initial detecting device for receiving the target mean square error and the target signal-to-noise ratio; wherein when the target signal-to-noise ratio is less than or equal to a preset signal-to-noise ratio threshold and the target mean square error is greater than or equal to a preset mean square error threshold, the first filtering device and the second filtering device are sequentially used to perform filtering processing on the adaptive image to obtain a processed image; when the target signal-to-noise ratio is less than or equal to the preset signal-to-noise ratio threshold and the target mean square error is greater than the preset mean square error threshold, the second filtering device is used to perform filtering processing on the adaptive image to obtain the processed image; when the target signal-to-noise ratio is greater than the preset signal-to-noise ratio threshold and the target mean square error is greater than or equal to the preset mean square error threshold, the first filtering device is used to perform filtering processing on the adaptive image to obtain the processed image; when the target signal-to-noise ratio is greater than the preset signal-to-noise ratio threshold and the target mean square error is less than the preset mean square error threshold, the adaptive recursive filtering device is used to perform filtering processing on the adaptive image to obtain the processed image;

a vehicle detecting device connected with the IMX6 processor for receiving the processed image and performing vehicle body recognition on the processed image to obtain the number of vehicles in the processed image to output as a real-time number of vehicles in front;

wherein the IMX6 processor is further connected with the loudspeaker mechanism and the vehicle detecting device for receiving the real-time number of vehicles in front and determining a sounding frequency of the loudspeaker mechanism based on the real-time number of vehicles in front, the more the real-time number of vehicles in front, the higher the sounding frequency of the loudspeaker mechanism;

wherein for the IMX6 processor, determining the sounding frequency of the loudspeaker mechanism based on the real-time number of vehicles in front further includes: when the real-time number of vehicles in front is less than or equal to a preset number, the sounding frequency of the loudspeaker mechanism is maintained at a fixed value.

2. The intelligent police car loudspeaker as claimed in claim 1, further comprising a cylindrical bracket disposed on the roof of the police car for fixing the loudspeaker mechanism and the light intensity detecting device.

3. The intelligent police car loudspeaker as claimed in claim 2, wherein the first filtering device, the second filtering device, the adaptive recursive filtering device, the first image initial detecting device, the second image initial detecting device and the vehicle detecting device are respectively implemented by using different CPLD chips.

4. The intelligent police car loudspeaker as claimed in claim 3, wherein the first filtering device, the second filtering device, the adaptive recursive filtering device, the first image initial detecting device, the second image initial detecting device and the vehicle detecting device are integrated on an integrated circuit board.

5. The intelligent police car loudspeaker as claimed in claim 4, wherein the first filtering device, the second filtering device, the adaptive recursive filtering device, the first image initial detecting device, the second image initial detecting device and the vehicle detecting device are disposed in a front dashboard of the police car.

6. The intelligent police car loudspeaker as claimed in claim 5, wherein the function of the light intensity change rate detecting device is replaced by the IMX6 processor.

* * * * *